United States Patent Office 3,076,813
Patented Feb. 5, 1963

3,076,813
α,β,γ,δ-TETRA-ARYLPORPHINS
Dexter B. Sharp, Vandalia, Ohio, assignor to Monsanto Chemical Company, St. Louis, Mo., a corporation of Delaware
No Drawing. Original application Nov. 13, 1957, Ser. No. 696,063, now Patent No. 2,950,237. Divided and this application Aug. 11, 1960, Ser. No. 48,847
5 Claims. (Cl. 260—314)

The present invention is directed to an improved method of preparing porphyrins by reacting pyrroles and aldehydes in the absence of solvent.

The invention is further directed to α,β,γ,δ-naphthylporphin as a new compound.

The invention relates to compounds in general conformity to the formula:

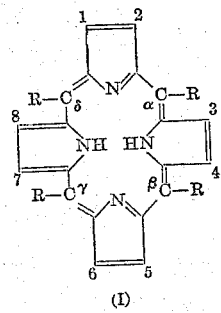

(I)

in which at least one R is an aryl group; any R's which are not aryl groups can be hydrogen or alkyl groups. R can be such monocyclic aryl or phenyl groups as, for example, phenyl, chlorophenyl, dichlorophenyl, methylphenyl, N,N-dimethylaminophenyl, hydroxyphenyl, etc., or any other phenyl groups. R can also be a di-, tri-, tetra-, or other polycyclic aryl group, for example, α-naphthyl, β-naphthyl, anthracyl, phenanthryl, etc. While the presence of any one or more of the above or other aryl groups at the designated positions in the porphyrin leads to high activity as a photoxidizing catalyst, it is preferred to utilize four aryl groups in the catalysts. The tetraaryl porphyrins are more readily prepared, and also generally have greater photoxidizing activity than do catalysts containing a smaller number of aryl substituents. α,β,γ,δ-Tetraphenylporphin is a very effective photoxidation catalyst.

The α,β,γ, and δ positions in the above formula are the meso positions.

In addition to the substituted phenyl groups noted above, the phenyl or aryl groups in the compounds, which are useful as photosensitizing catalysts, can have any or a combination of such substituents, for example, as alkyl groups; for example, methyl, ethyl, propyl, isopropyl, butyl, isobutyl, secondary butyl, tertiary butyl, n-amyl, isoamyl, tertiary amyl, n-hexyl, decyl, dodecyl, etc.; alkoxy substituents, for example, methoxy, ethoxy, isopropoxy, butoxy, hexyloxy, etc.; halogen substituents, for example, bromine, chlorine, fluorine, and iodine; and other substituents which do not change the fundamental aromatic character of the groups. Of course, the porphyrins can have substituents at other positions, particularly at the numbered positions in the above formula, for example, such substituents as ethyl, methyl, vinyl, and propionic acid groups, etc., or phenyl groups, including any of the substituted phenyl groups referred to hereinbefore.

It will be understood that the use of the metal chelate forms of the above structure is also included in the present invention. Such metals as, for example, zinc, magnesium, copper, iron, nickel, cobalt, lead, etc., can readily be chelated with porphyrins, and the resulting chelates are effective as photosensitizers. The chelates can be represented by the above porphyrin structure, with the following bonding between the metal and the pyrrole nitrogens.

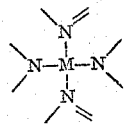

Various other metals also form chelates of the described porphyrins which are effective as catalysts, for example, alkali and alkaline earth metals such as sodium, potassium, calcium, etc. It will be understood that when porphyrins are described or claimed herein, generically or specifically, by structural formula or otherwise, the metal chelate forms as well as the free bases are contemplated.

The following examples illustrate procedures which can be used in preparing the meso-aryl porphyrins (see Formula I) utilized in the photoxidation procedures of my aforesaid application S.N. 696,063. In general, the meso-aryl porphyrins are prepared by reaction of pyrrole with a particular aromatic aldehyde to obtain the corresponding meso-aromatic substituted porphyrin [Ball, Dorough and Calvin, J. Am. Chem. Soc., 68, 2278 (1946)]. Various porphyrin derivatives can be obtained by simply employing substituted benzaldehydes or substituted pyrroles in their preparation. Or, alternatively, various aryl-substituted compounds can be employed which will condense to form the pyrrole rings as well as the great porphyrin ring (Linstead et al., J. Chem. Soc., 1937, 929; 1940, 1079). For example, α,α'-diphenyl-maleimide will condense upon heating in the presence of zinc, copper, or magnesium salts or oxides, for example, cuprous chloride or magnesium oxide, in particular, with zinc phenylacetate to α,β,γ,δ,1,2,3,4,5,6,7,8-dodecaphenylporphyrin [Helberger and Rebay, Ann., 536, 181 (1938)]. In preparing the porphyrins, mixtures of substituted and unsubstituted pyrroles, benzaldehydes or other reactants can be employed to obtain porphyrins containing various combinations of substituted and unsubstituted pyrrole groups, and substituted and unsubstituted phenyl groups.

*Example 1*

Each of three Carius tubes was charged with 20 ml. pyridine, 10 grams zinc acetate, and 10 ml. pyrrole. Each of the tubes was then charged with one of the following aldehydes in the stated amount: anisaldehyde—18 ml., 1-naphthaldehyde—20 ml., 2-thiophenecarboxaldehyde—14 ml. Each tube was then flushed with nitrogen, sealed, and heated in a furnace at 200° C. for 48 hours.

The tube containing the reaction product of pyrrole and anisaldehyde was opened and the contents were transferred to a beaker with about 300 ml. chloroform. Hydrochloric acid (37 ml. H$_2$O to 63 ml. concentrated hydrochloric acid) was added with stirring, followed by 65 ml. concentrated NH$_4$OH; the separation of the phases was poor because of emulsion formation. The liquids were restirred with hydrochloric acid (20 ml. H$_2$O:40 ml. concentrated hydrochloric acid). The chloroform layer was separated, stirred with 30 ml.

NH$_4$OH and again separated. The chloroform solution was evaporated to about 100 ml. and chromatographed on an alumina column (Alcoa F-1, 48–100 mesh). Blue crystals separated at the top of the column. The material was eluted with chloroform, and the chloroform eluate was evaporated to give a gummy solid. The solid was dissolved in chloroform and the resulting solution was filtered; upon evaporation of the chloroform from the filtrate, 1.91 grams of blue crystalline α,β,γ,δ-tetrakis(4-methoxyphenyl)porphyrin was obtained.

The tube containing the naphthaldehyde-pyrrole reaction product was opened and the contents were rinsed into a beaker with 200–300 ml. chloroform. Hydrochloric acid, 100 ml. (37 ml. $H_2O$:63 ml. concentrated hydrochloric acid) was stirred into the chloroform. The chloroform phase was separated, washed, and stirred with 50 ml. concentrated $NH_4OH$. Water was added to give a good separation. The chloroform solution was chromatographed on alumina (Alcoa F-1 $Al_2O_3$, 48–100 mesh); evaporation of chloroform eluate from the chromatogram gave a gummy material which was redissolved in a minimal amount of chloroform, again isolated by evaporation of the chloroform, dissolved in additional chloroform, and run through an $Al_2O_3$ column (top half, Alcoa F-1 48–100 mesh; bottom half, Alcoa F-20); evaporation of the first chloroform eluate fraction gave 2.1 grams of violet solid $\alpha,\beta,\gamma,\delta$-tetrakis(1-naphthyl)porphyrin, and evaporation of the second fraction gave 4.07 grams of similar solids.

The tube containing the product of the reaction of 2-thiophene-carboxaldehyde and pyrrole was opened, rinsed with acetone, and filtered. The crystalline solids were dissolved in chloroform and stirred with 100 ml. aqueous hydrochloric acid. Concentrated ammonium hydroxide was then added, and the chloroform layer was separated and chromatographed on $Al_2O_3$. Evaporation of the first eluate fraction gave 1.1 grams of blue-purple solid $\alpha,\beta,\gamma,\delta$-tetrakis($\alpha$-thienyl)porphyrin, while evaporation of the second eluate gave 2.27 grams of this product.

Example 2

In a Pyrex Carius tube were placed 20 grams zinc acetate, 34 ml. (0.32 mole) benzaldehyde, and 22 ml. pyrrole (0.32 mole). The tube was flushed with nitrogen, sealed, and heated at 200° C. for 48 hours. The tube, which now contained large crystals, was opened and the contents were removed in chloroform, and 1.64 grams of blue zinc $\alpha,\beta,\gamma,\delta$-tetraphenylporphin crystals was obtained by filtration. The chloroform was evaporated from the filtrate, and 500 ml. methanol was added to the residue, heated to reflux, and filtered from the tarry residue; the methanol extraction was repeated twice more, and the methanol was then evaporated from the extracts, and the residue was pulverized and extracted overnight in a Soxhlet extractor with acetone-ether solution (5% by volume acetone). The extracts were evaporated to give a purple solid; the Soxhlet boiler was charged with chloroform and extraction was continued. The Soxhlet extracts were dissolved in chloroform and chromatographed on $Al_2O_3$ (Alcoa F-1 grade). Some yellow forerun was obtained which was readily photoxidizable to the purple compound. The purple band on the chromatogram was eluted to give 12.40 grams of solids, and evaporated to dryness along with the methanol extracts from above. The tarry residue from the methanol filtration above was run through an $Al_2O_3$ (F-1 grade) column with chloroform. The forerun, prior to the main purple band, was yellow; but upon exposure to sunlight or artificial light, the solution immediately darkened to a deep purple. The eluates were collected and evaporated. The solids from the purple band from the chromatographing of the Soxhlet extracts above. All residues from the Soxhlet extractions were dissolved in chloroform and chromatographed on F-20 grade alumina. A single gray-black band moved down the column slowly; the forerun eluate-1 contained the yellow photosensitive compound; when the main band started eluting, eluates 2 and 3 were taken, but exhibited no porphyrin spectral bands (wedge filter). Eluates 4, 5, and 6 exhibited strong tetraphenylporphyrin bands and were evaporated to purple residues, which were dissolved in chloroform and re-chromatographed on F-20 grade $Al_2O_3$. The eluates from the main band were collected and evaporated to give 7.26 grams of $\alpha,\beta,\gamma,\delta$-tetraphenylporphin. The light-sensitive foreruns noted above, which were found to be equivalent to zinc tetraphenylporphyrin in photosensitizing photoxidations, were combined to give 12.21 grams of compound. This compound, taken with 5 grams of tetraphenylporphin separated from a residue fraction, makes a total of 39.1 grams of photoxidation catalyst, for a yield of 72.3%. The light sensitive material may be a porphyrin isomer or chlorin which undergoes rapid photoxidation to tetraphenylporphin when exposed to light. Priesthoff and Banks [J. Am. Chem. Soc., 76, 937 (1954)], obtained 18% yield when pyridine was included as solvent.

Example 3

In a Pyrex Carius tube were placed 10 grams of zinc acetate, 13 ml. of benzaldehyde, 5 grams of benzoic acid, 11 ml. of pyrrole, and 20 ml. of pyridine. The tube was flushed with nitrogen, sealed, and heated at 200° C. for 48 hours. The tube was opened and the tetraphenylporphin was isolated by extraction and chromatographic procedures similar to those Example 2; however, the yield of tetraphenylporphin was only 7%. When pyridine was omitted, but 4.2 grams of benzaldehyde and 14.6 grams of benzoic acid were employed, only a trace of tetraphenylporphin was obtained.

Example 4

Four Pyrex Carius tubes were charged with porphyrin-forming reactants as individually described below, flushed with nitrogen, sealed and heated at 200° C. for 48 hours in a Carius furnace. The contents of the tubes were then removed, either mechanically or by solution and evaporation of the solvent.

*Tube A.*—The charge to tube A was 34 ml. (0.32 mole) benzaldehyde and 11 ml. (0.16 mole) pyrrole. The charge did not include any solvent, nor did it include any zinc salt as catalyst. After decantation of reaction water, the amount of reaction product was 42 grams compared to the total charge of 45 grams. A 2.000-gram portion of the reaction product was dissolved in chloroform and chromatographed on a large F-1 $Al_2O_3$ column to give the following eluates: (1) An amber material which darkened somewhat on exposure to light, 0.845 gram (by weight); spectral analysis disclosed prominent tetraphenylporphin bands. (2) A light amber material which was light-sensitive and gave less prominent tetraphenylporphin bands, 0.209 gram. (3) A green-brown material which exhibited no tetraphenylporphin bands, 0.932 gram; this material probably results from the excess benzaldehyde reactant. The three eluates represent a 99.3% recovery of the chromatographed material. Eluates 1 and 2 appear to be a mixture of $\alpha,\beta,\gamma,\delta$-tetraphenylporphin and its light-sensitive "isomer," eluate 2 being mostly the light-sensitive isomer. As the light-sensitive isomer is photocatalytically active, as indicated hereinbefore, the yield of active material is 90% of theory. It is thus clearly shown that improved results are obtained in the absence of solvent. It is also shown that zinc salt or similar condensing agent is not required for the reaction, and that a 2:1 molar ratio of aldehyde to pyrrole is very satisfactory.

*Tube B.*—The charge to tube B was 17 ml. (0.16 mole) benzaldehyde, 11 ml. (0.16 mole) pyrrole, and 10 grams $Zn(OAc)_2 \cdot 2H_2O$. No solvent was included. The 38-gram charge produced 35.4 grams of reaction product, after decantation of reaction water. A portion of the reaction product (2.000 grams) was chromatographed as described in the procedure for tube A. The first eluate contained 0.178 gram of an amber material which darkened upon exposure to light. The second eluate contained a pale yellow material, 0.318 gram, which turned purple on exposure to light; spectral analysis showed bands at 565 mu, and at 490 mu. Collection of the third eluate containing the maroon zinc tetraphenylporphin was started when the 550 mu band appeared in the eluate; 0.860 gram of the compound was obtained. The yield of zinc tetraphenylporphin (third eluate) was 56% of theory, and the total yield of photocatalytically active porphyrin was 88%. This again demonstrates the value of a solvent-free preparation. The condensing agent in this procedure was useful in permitting isolation of the zinc tetraphenylporphin in very high yield.

*Tube C.*—The charge to tube C. was 51.31 ml. (0.48 mole) benzaldehyde and 11 ml. (0.16 mole) pyrrole. The 62-gram charge produced 58.6 grams of reaction product after removal of water. A portion, 2.000 grams, of the product was dissolved in 50 ml. chloroform and chromatographed on F-20 $Al_2O_3$. The second eluate, 0.54 gram, consisted mostly of tetraphenylporphin; this is a 64.4% yield of the material. The third, fourth, and fifth eluates contained light-sensitive "isomer" and together with the second eluate would amount to more than a 100%; this indicates that the product was contaminated to some extent with the excess benzaldehyde.

*Tube D.*—The charge to tube D included 27.3 ml. (0.20 mole) 1-naphthaldehyde and 11 ml. (0.16 mole) pyrrole. A 2.000-gram portion of the reaction product was dissolved in 50 ml. chloroform and chromatographed on F-20 $Al_2O_3$. The first eluate of slightly light-sensitive material exhibited strong porphyrin bonds; the amount of this $\alpha,\beta,\gamma,\delta$-tetrakis(1-naphthyl)porphin was 0.370 gram for 24.5% of theory. The second eluate contained a light-sensitive material, 0.218 gram, with weak porphyrin bands, and the third eluate contained 0.13 gram of light-sensitive material with bands circa 500 mu and 560 mu. The total catalyst material constituted 47.5% of the theoretical yield of porphyrin. The yields of both total catalyst material and isolated $\alpha,\beta,\gamma,\delta$-tetrakis(1-naphthyl)porphin are much larger than can be obtained when solvents are used in the preparation. Moreover, the yields could be improved by employing pure naphthaldehyde and pyrrole as starting materials. In addition, a fifth eluate fraction of 1.02 grams of brown material exhibited definite porphyrin bands, and rechromatographing would yield additional $\alpha,\beta,\gamma,\delta$-tetrakis(1-naphthyl)porphin.

The aldehydes and pyrrole utilized in this example were not redistilled prior to use.

The solvent-free preparation is applicable in general to the preparation of porphyrins by the reaction of pyrroles and aldehydes. The reaction in bulk improves the yields in the reactions of pyrroles with aromatic, aliphatic, alicyclic, and heterocyclic aldehydes, and all of the resulting porphyrins have photocatalytic properties. However, the solvent-free process is particularly valuable in the preparation of meso-aryl porphyrins. In the solvent-free reaction of aryl aldehydes and pyrroles, aryl aldehydes in general and pyrroles in general can be used. For example, any of the pyrrole and phenyl or substituted phenyl reactants necessary to obtain any of the meso-aryl porphyrins disclosed herein, either specifically or by inclusion in a generic class, can be reacted by the solvent-free procedure of the present invention with improved results; as aliphatic aldehyde reactants, the 1-oxoalkanes are preferred, particularly those containing 1 to 8 carbon atoms, for example, acetaldehyde, isobutyraldehyde, formaldehyde, hexaldehyde, etc.

My novel preparation of porphyrins is conducted by simply heating the pyrrole and aldehyde together. The reaction is ordinarily conducted in a sealed tube under autogenous pressure at temperatures sufficient to cause conversion to porphyrins, for example, at temperatures of the order of about 150° to about 250° C. for about 5 to about 75 hours. It is preferred to conduct the reaction in the presence of a condensing agent, such as an inorganic salt or oxide. Any metal ions known to chelate porphyrins are suitable, including metal ions of groups I, II, and III and the transition metals, for example, Mg, Ca, Cu, Li, Ag, Pb, Ba, Fe, Ni, Co, Cr, Na, Al, etc. For example, zinc salts and oxides are very suitable for this purpose, particularly zinc acetate and zinc oxide. The contemplated inorganic salts include the metal salts of organic acids as well as the metal salts of inorganic acids. In addition to the foregoing illustrative conditions, any of the known methods for conducting the condensation of pyrroles and aldehydes to porphyrins in solvent media can be employed in my improved solvent-free condensation of pyrroles and aldehydes to porphyrins. The mole ratio of aldehyde to pyrrole can vary greatly, for example, from less than 1 up to 3 or more moles of aldehyde for each mole of pyrrole. As pyrrole is expensive, it is ordinarily desirable to employ at least about 1 mole of aldehyde for each mole of pyrrole, and it is preferred to employ no more than about 2 moles of aldehyde for each mole of pyrrole.

The meso-naphthyl porphyrins are new compounds which were not known prior to the present invention. The meso-naphthyl porphyrins are very valuable photocatalysts. In addition, the naphthyl groups enhance the oil solubility of the compounds and make them useful in some media where less oil-soluble aryl porphyrins would not be very effective.

This application is a division of my application S.N. 696,063, filed on November 13, 1957, now matured to Patent No. 2,950,237.

What is claimed is:

1. In the preparation of porphins by the reaction of pyrrole and an aldehyde, the improvement which comprises heating the reactants in the absence of solvent to 150° to 250° C.

2. In the process of preparing $\alpha,\beta,\gamma,\delta$-tetraphenylporphin, the improvement which comprises heating to 150° to 250° C. 1 mole of pyrrole with about 1 to about 2 moles of benzaldehyde in the absence of solvent.

3. The process of preparing alpha,beta,gamma,delta-tetrakis(1-naphthyl)porphin which comprises heating materials consisting of pyrrole, naphthaldehyde, and a zinc compound selected from the group consisting of the salts and oxides of zinc to about 150° C. to 250° C. for about 5 to 75 hours to obtain the alpha,beta,gamma,delta-tetrakis(1-naphthyl)porphin.

4. Alpha,beta,gamma,delta-tetrakis(1-naphthyl)porphin.

5. In the preparation $\alpha,\beta,\gamma,\delta$-tetraphenylporphins by the reaction of pyrrole, benzaldehyde, and a zinc compound selected from the group consisting of salts and oxides of zinc, the improvement which comprises heating a system consisting of the foregoing named components to about 150°–250° C. for about 5 to 75 hours.

References Cited in the file of this patent

UNITED STATES PATENTS 2,647,908    Buc    Aug. 4, 1953

OTHER REFERENCES

Richter's Organic Chemistry, vol. III, Elsevier, New York (1946), page 603.

Conant et al.: Chemistry of Organic Compounds, Macmillan, New York (1947), page 560.

Venkataraman: Synthetic Dyes, Academic Press, New York, N.Y. (1952), page 1120.

Venkataraman: Synthetic Dyes, vol. II, Academic Press, New York (1952), page 1128.

Ball et al.: Jour. Amer. Chem. Soc., vol. 68, pp. 2278–2281 (1946).

UNITED STATES PATENT OFFICE
CERTIFICATE OF CORRECTION

Patent No. 3,076,813            February 5, 1963

Dexter B. Sharp

It is hereby certified that error appears in the above numbered patent requiring correction and that the said Letters Patent should read as corrected below.

Column 3, line 61, after "purple band" insert -- were combined with the purple band --; column 4, line 19, after "those" insert -- of --; column 5, line 16, after "100%" insert -- yield --.

Signed and sealed this 3rd day of September 1963.

(SEAL)
Attest:

ERNEST W. SWIDER
Attesting Officer

DAVID L. LADD
Commissioner of Patents